G. J. BUNDY.
Potato-Digger.
No. 11,206.  Patented July 4, 1854.
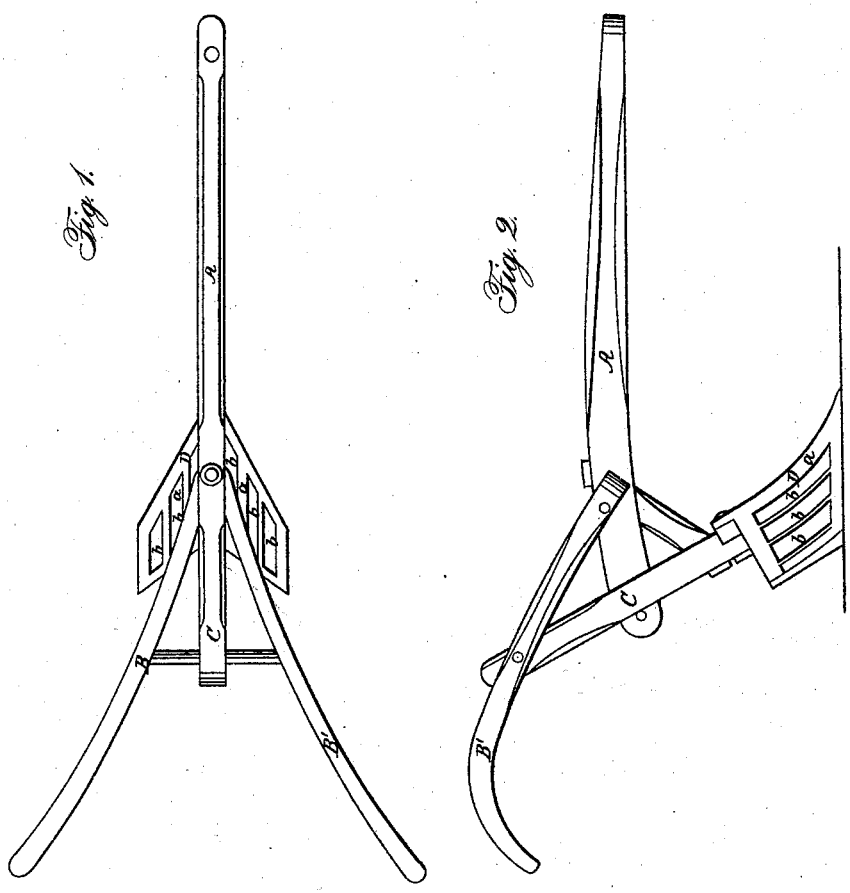
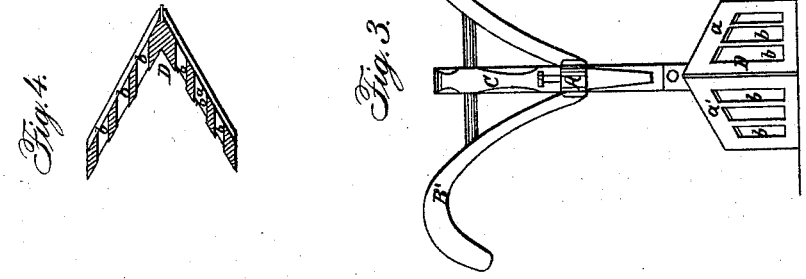

UNITED STATES PATENT OFFICE.

GALUSHA J. BUNDY, OF LYNDON, VERMONT.

IMPROVEMENT IN POTATO-DIGGERS.

Specification forming part of Letters Patent No. 11,206, dated July 4, 1854.

*To all whom it may concern:*

Be it known that I, GALUSHA JONAS BUNDY, of Lyndon, in the county of Caledonia and State of Vermont, have invented a new and Improved Machine for Digging Potatoes; and I do hereby declare that the same is fully described and represented in the following specification and the accompanying drawings, letters, figures, and references thereof.

Of the said drawings, Figure 1 represents a top view, Fig. 2 a side elevation, and Fig. 3 a front view, of my improved potato-digger. Fig. 4 is a transverse section of its mold-board.

This instrument is made in many respects like a common plow—that is to say, it has a beam, A, and handles B B', united to an inclined post or bar, C, to which the scoop or plowshare D is affixed, as seen in the drawings. This scoop or plowshare is formed with two angular mold-boards, *a a*, which make an angle with each, as seen in the drawings.

The improvement consists in providing these mold-boards with slots or openings *b b b*, arranged in, or nearly in, vertical directions— that is to say, standing upward rather than horizontally. The planes of these slots are disposed parallel to each other and to the plane of the beam, and they are each made to extend from near the bottom of each mold-board to near the top of the same. Through these openings, passages, or slots the dirt passes while the machine is used in plowing through or digging into a potato-field, the potatoes being thrown upon each side of the furrow and left in full sight.

Now, I am aware that inclined fingers in combination with a scoop have been heretofore employed in a machine for digging potatoes, and to such fingers a vibratory motion has been imparted in order to separate and discharge the earth, the earth being made to drop through the spaces between the teeth or fingers, while the potatoes are forced up the inclined plane formed by the fingers.

I am also aware that for the purpose of loosening the ground or reducing its surface to a finer state than it was previously there is nothing new in the employing on a mold-board a horizontal plate and vertical cutters extending upward from two to three inches therefrom. Such cutters, when so applied to a mold-board, do not and never were intended to perform the functions of my improved mold-board, so far as plowing under and elevating the potatoes are concerned, as they simply serve and were only intended to cut up or loosen the grassy or top surface of the soil, while the mold-board under them passed under it and the potatoes and lifted them. Practically speaking, the whole of my mold-board works through the earth, and, like a grating or sieve, separates the potatoes from the surrounding earth and raises them and leaves the earth, or most of it, in place. I therefore do not claim any such invention; but What I do claim as my invention is—

My improvement in the construction of the mold-boards of a potato-plow, or the making them with slots or passages standing vertically, or nearly so, and having their respective planes parallel to a vertical plane passing through the draft-beam of the machine, all substantially as stated.

In testimony whereof I have hereunto set my signature this 7th day of December, A. D. 1853.

GALUSHA JONAS BUNDY.

Witnesses:
GEORGE C. CAHOON,
SAMUEL BIGELOW.